United States Patent [19]

Dickson et al.

[11] Patent Number: 5,401,344
[45] Date of Patent: Mar. 28, 1995

[54] METHOD AND APPARATUS FOR PRODUCING SHIPPING ROLLS OF WRINKLE FREE COMPOSITE SHEET MATERIAL

[76] Inventors: Lawrence J. Dickson, 558 Cedar Run Rd.; Donald L. Blake, 4489 Newton Rd., NE., both of Newark, Ohio 43055

[21] Appl. No.: 79,902

[22] Filed: Jun. 22, 1993

[51] Int. Cl.6 .................................. B32B 31/00
[52] U.S. Cl. .............................. 156/90; 156/184; 156/285; 156/289; 156/311; 156/324; 156/382
[58] Field of Search ............... 156/324, 90, 184, 194, 156/191–192, 382, 583.3, 285, 289, 311

[56] References Cited

U.S. PATENT DOCUMENTS

| | | | |
|---|---|---|---|
| 3,162,561 | 12/1964 | Farkas | 156/380 |
| 3,713,930 | 1/1973 | Levrini et al. | 156/147 |
| 3,767,500 | 10/1973 | Tally et al. | 156/324 |
| 3,822,166 | 7/1974 | Anderson | 156/426 |
| 4,025,373 | 5/1974 | Hirsch et al. | 156/66 |
| 4,087,300 | 5/1978 | Adler | 156/184 |
| 4,088,805 | 5/1978 | Wiegand | 428/310 |
| 4,348,444 | 9/1982 | Craig | 428/137 |
| 4,427,474 | 1/1984 | Ottaviano | 156/148 |
| 4,431,470 | 2/1984 | Schubert | 156/265 |
| 4,541,891 | 9/1985 | Leatherman | 156/382 |
| 4,636,275 | 1/1987 | Norell | 156/583.3 |
| 4,859,267 | 8/1989 | Knoll | 156/285 |
| 4,973,364 | 1/1989 | Farrar | 156/84 |
| 4,980,008 | 12/1990 | Woods et al. | 156/583.3 |
| 4,995,930 | 2/1991 | Merz | 156/209 |
| 4,997,511 | 3/1991 | Newsom | 156/382 |

*Primary Examiner*—Chester T. Barry
*Attorney, Agent, or Firm*—Charles F. Schroeder

[57] ABSTRACT

A method and apparatus for producing shipping rolls of wrinkle free ballistics type film faced composite sheet material which when assembled and cured on a shipping tube is subject to having surface wrinkles and creases. By assembling the material on a forming roll of large diameter, such that the thickness of the wound wraps of a given length of the sheet material is relatively thin, the deformation of each wrap is minimized during heat and compression curing and the cured material is free of surface wrinkles and creases. The cure-stabilized material then can be unwound and cut to desired length and wound on a small diameter shipping tube to provide a shipping package of material free of wrinkles and creases. The curing apparatus includes a cylinder with an internally lined inflatable bladder, such cylinder being adaptable to being moved into surrounding relation with the sheet material. The forming roll is arranged to supply heat from the interior of the assembled wraps of material while the surrounding inflated bladder exerts pressure to cure the material over a predetermined cure cycle.

13 Claims, 2 Drawing Sheets

METHOD AND APPARATUS FOR PRODUCING SHIPPING ROLLS OF WRINKLE FREE COMPOSITE SHEET MATERIAL

FIELD OF THE INVENTION

This invention is a method and means for producing a continuous length ballistics type composite sheet material in a roll process under heat and pressure wherein the composite sheet includes a resin-impregnated network of high strength, high modulus filaments as a core and major surfaces faced with resinous sheet film.

BACKGROUND AND PROBLEM

Composite ballistic resistant sheet materials with a core of high modulus filaments of the type made by the present invention, such as for bullet resistant vests, helmets, briefcases and raincoats, are usually produced in a flat press. Such a flat press subjects the composite sheet to uniform heat and pressure on both sides to cure the component materials to a stable consolidated condition with smooth surfaces free of wrinkles or creases. Such press operations, however, are dimensionally limiting in that the sheet material which can be made in the press is limited in dimensions by the press platen dimensions.

Attempts have been made to overcome this dimensional limitation by assembling the composite in a long length which can be wound directly on a shipping tube to form a roll package, like a bolt of cloth, of size suitable for shipment for subsequent processing and use, whereby the composite can have a desired longitudinal dimension for new products considerably greater in size than those possible with the limiting dimensions imposed by the platens of a press. In this regard it would be highly desirable if the composite could be formed and wound in roll form on the core or tube of a shipping package and subjected directly to heat and pressure on the tube by placing the package in an autoclave. However, difficulties have been experienced in pursuing this route for forming the desired composite in that unacceptable wrinkles and creases are formed in the surfaces of the final product. Such incongruities apparently are caused by the compression confinement of the volume of the stacked layers of a given length of the longitudinal composite sheet assembly and its relatively sharp bend over the small radius of curvature of the shipping tube and package in which condition it is then subjected to curing heat. If the composite sheet can be furnished to the customer in continuous roll form however rather than in rectangles it can be handled in new ways such for example as being draped as a fabric. Such treatment opens avenues of fabrication into many new manufactured articles.

SOLUTION

It has been found that the problem of objectionable wrinkling and creasing in the surfaces of the high modulus filament network composite when placed on a small diameter roll can be overcome according to the present invention, contrary to lack of success in prior attempts in this direction. By assembling and curing a given length of such sheet material on a large drum having a radius of curvature sufficiently large, wrinkles and creases can be eliminated in that the stack of layers is relatively smaller in thickness and bending occurs over a gradual curve rather than over a sharp bending region of a smaller diameter core of a shipping package. By so winding a given length of elongate composite on a large drum, the differences in length of layers of material between the top and bottom surfaces is relatively small and tendencies to crinkle the layers caused by compression of the relatively small depth of the winding is diminished so that after stabilization under heat and pressure there is practically little difference in longitudinal dimension of layers between the top and bottom surfaces. The drum diameter can be determined by trial and error such that practically no wrinkles or creases are formed in the cured product. After being cured to a dimensionally stabilized condition on the large drum, the composite can then be wound on a smaller shipping size core without imparting the objectionable wrinkles or creases in the material wound in the package.

The invention is specifically described herein in relation to a flexible laminate sheet including a resin-impregnated cross plied web of two or more layers of filament strands aligned longitudinally and crosswise of the laminate. The network of filaments when impregnated with thermoplastic resin is made to a thickness, such that for the elongation characteristics of the thermoplastic resin, the composite when heat set is flexible. The cross plied filament is introduced between two sheets of surface film, more specifically such as polyethylene film, which provides the exposed surfaces of the composite sheet. After assembly and winding of the composite on a large diameter drum, with a separating film between wraps of the composite, it is subjected to heat and pressure to cure the film and prepreg components into an integrated structure of stable dimension. The ratio of the thickness of the composite sheet to the equivalent diameter of the filaments is less than 10 and preferably is in a ratio range of 1 to 5. The filaments may have any of a number of cross sectional shapes preferably with an equivalent diameter equal to or less than 0.04 cm. Although the composite is herein described in relation to incorporating two 90 degree cross plied prepreg network layers of filaments as many as five layers might be incorporated in such a prepreg with the added layers, for example, rotated at plus or minus 45 degrees, 90 degrees and 0 degrees with respect to the first layer.

The composite after being cured on the assembly drum is then ready for withdrawal from the drum to be wound into a shipping package on a shipping core of relatively small diameter, which package upon subsequent unwinding for use is practically free of surface wrinkles and creases. A separator or interleaf film such as Mylar is provided inbetween adjacent wraps of the composite sheet material on the drum to permit the composite to be unrolled freely without sticking between the otherwise contacting surfaces of the composite being cured.

An object of the invention is to provide a process for forming and curing a continuous length of film faced resin-impregnated high modulus filament network as a composite sheet capable of being wound into a relatively small diameter roll-type shipping package which when unwound will be free of surface wrinkles and creases.

Another object of the invention is to provide apparatus for forming ballistic type composite sheet material on an assembly drum adapted to treatment of the product under heat and pressure for a cure of the assembly of materials without need for transport to another location.

A feature of the invention is the relatively long length to which the product can be made substantially without the limitation in length usually presented by press type heating and pressurizing means.

Other objects and features which are believed to be characteristic of our invention are set forth with particularity in the appended claims. Our invention, however, both in organization and manner of construction, together with further objects and features thereof may be best understood by reference to the following description taken in connection with the accompanying drawings.

DETAILED DESCRIPTION

Figure 1:
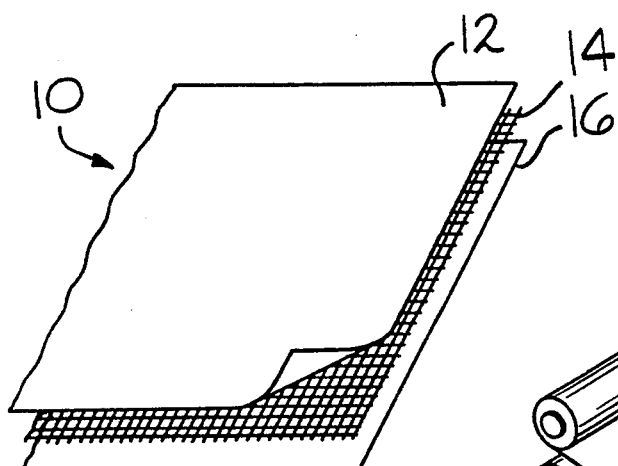
FIG. 1 is a schematic illustration in perspective of a portion of a film faced fibrous core sheet material of the type formed by the process of the present invention.

Turning to the drawings in greater detail, FIG. 1 shows a broken away section of a continuous composite sheet made according to the process of the present invention. The composite sheet has a cross plied fiber web 14 interposed between two surface film layers 12 and 16. Although the layers as shown in FIG. 1 are in separated spaced relation for illustration purposes, the final product is integrated with the surface and web layers combined in integrated relation as a flexible composite laminate sheet 10.

Figure 7:
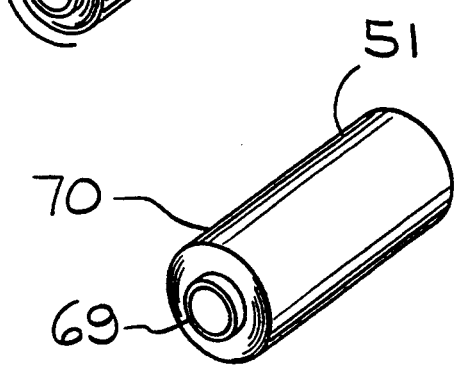
FIG. 7 is an illustration of a shipping package of the composite sheet material described herein as it appears after being as a shipping package on a small diameter shipping core.

The composite sheet is desirably wound into a shipping package 70 as shown in FIG. 7, wherein the composite material 10 is wound on a relatively small diameter shipping tube 69 having a diameter for example in the order of 8, 10 or 12 inches. It has been found, however, that in winding an uncured assembly of surface films with an interposed prepreg cross plied reinforcing web of high modulus filaments incorporating resin either in a sticky B stage or in a solid stage into a shipping package on a shipping package size tube and then subjecting it to heat and pressure for a cure, such as in an autoclave, that the resulting cured product will have unacceptable surface creases and wrinkles.

According to the present invention, however, such objectionable surface characteristics can be overcome by assembling and, in a sense, molding the separate film surface layers of a given length into integrated relation with the intermediate cross plied prepreg on a large diameter forming roll or drum considerably larger than that to which the composite assembly would be subjected if wound and cured on a shipping tube. The radius of curvature of the forming drum is sufficiently large that the treatment of the composite under pressure and heat thereon is akin to treatment between platens of a flat press. In this regard the thickness of the stack of wraps of given length material in the winding can be sufficiently thin and the curvature is such that the differential in length of successive layers in the relatively thin winding is dimensionally practically uniform during treatment under heat and pressure.

Figure 2:
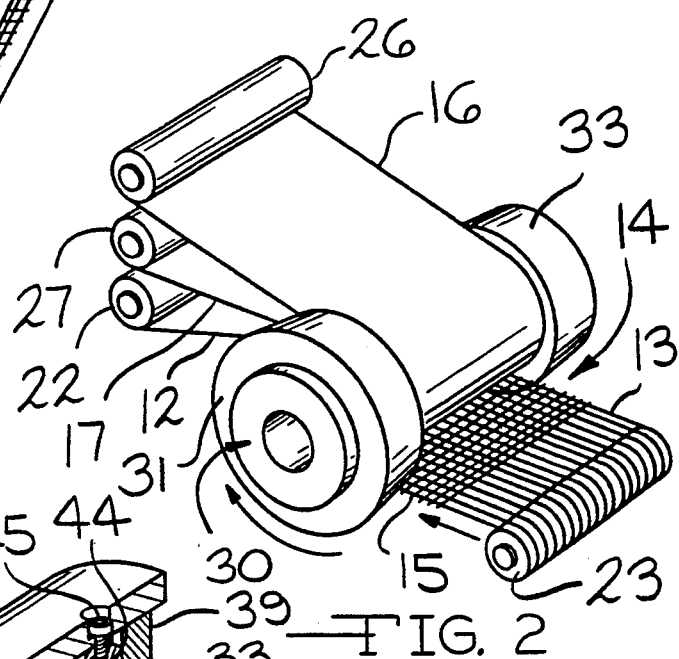
FIG. 2 is a schematic illustration in perspective of an arrangement for supply of material to a drum for fabrication of the product of FIG. 1 according to the principles of the present invention.

The forming drum 30 as shown in FIG. 2 collects the two surface film layers 12 and 16 from two supply rolls 22 and 26 of such material. The surface films are of material such as polyethylene. Separator film layer 17, such as of Mylar, is drawn from an intermediately positioned supply roll 27 of such film. The prepreg cross plied web 14 is formed of a prepregged continuous layer 13 of high modulus parallel continuous filaments fed to the underside of the drum 30 while a filling layer or warp layer 15 of parallel filaments in the form of prepreg sheets is hand laid successively in crosswise relation on the warp layer 13 as it is withdrawn from a reel or a supply roll 23 before it passes under the drum 30. As an alternate, the network of filaments may be incorporated in a woven fabric. Retaining shoulders 31 and 33 at opposite ends of the drum 30 guide the assembly into wrapped relation as a winding 50 on the drum.

A feature of the invention is that the drum 30 with a continuous preselected given length winding 50 thereon, according to the present invention need not be transported to another location for heat and pressure treatment to integrate the composite assembly. This is accomplished by surrounding the drum 30 and the winding 50 thereon with an external pressure casing 40 extending over the full length of the drum 30 which applies pressure to the winding 50 by way of an inflatable bladder 41 lining the interior of the casing. Heat is supplied from the interior of the winding 50 by passing hot fluid, such as hot oil, through fluid passages 35 extending through the wall of the drum 30.

Figure 5:
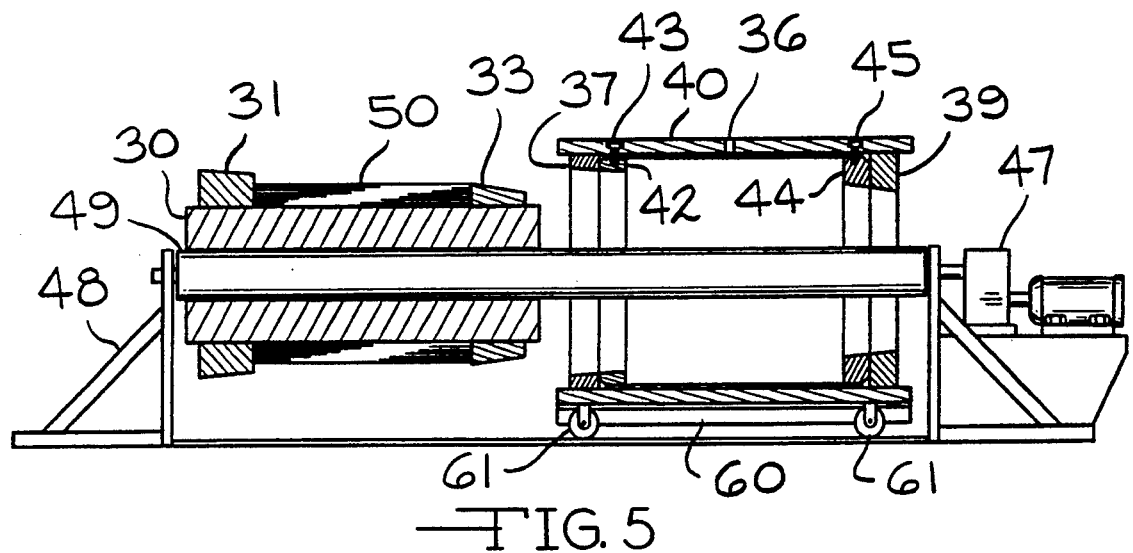
FIG. 5 is a schematic side elevational view in cross section of the drum with the product thereon illustrated in FIGS. 2-5 showing how the cylinder of FIGS. 3 and 4 can be supported for movement in surrounding relation with the forming drum and product wound thereon.
Figure 6:
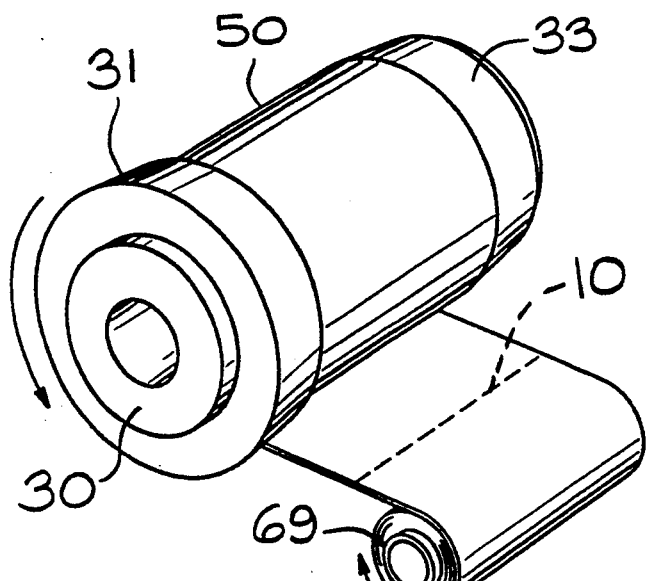
FIG. 6 is a schematic illustration in perspective of the assembly drum with the product being withdrawn therefrom for winding into a smaller diameter shipping package.

The pressure casing 40 as illustrated in FIG. 5 can be moved in surrounding relation with the heating drum 30 and the winding 50 of composite material thereon by providing the casing with a mobile transport carrier 60 having rollers 61 which permit movement of the casing from a lateral position into surrounding relation with the drum. A rotatable elongate mandrel 49 mounted on a support frame 48 supports the drum 30 and extends through the mobile casing in its lateral position. A drive motor 47 connected in driving relation with the mandrel 49 supplies rotational power for the collection drum 30 mounted thereon.

Figure 3:
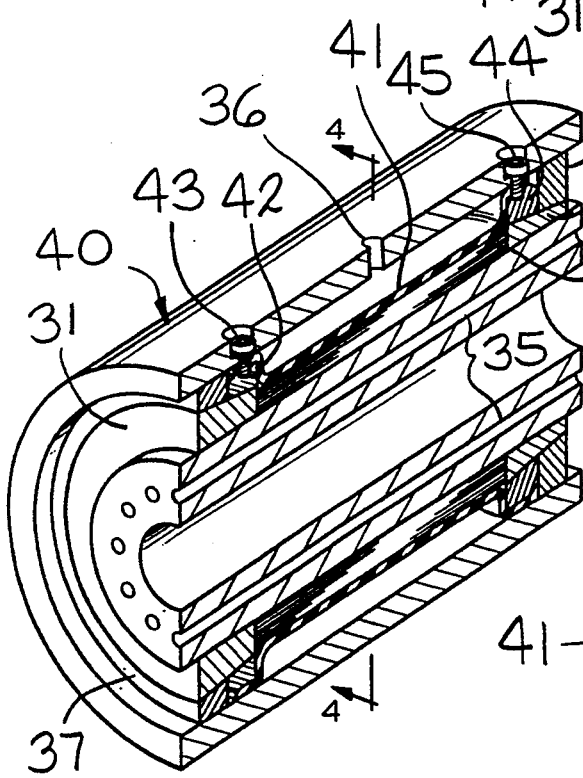
FIG. 3 is a perspective view in cross section of the drum of FIG. 2 and product assembled thereon surrounded by a cylinder having a fluid inflatable pressurizing bag lining its interior overlying the product wound on the drum.
Figure 4:
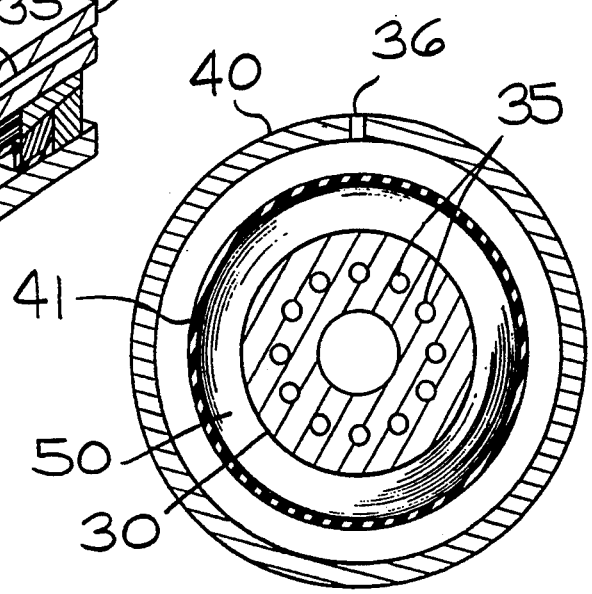
FIG. 4 is a cross sectional view of the cylinder surrounded drum and product of FIG. 2 as taken on line 4—4 of FIG. 3.

As can be seen more clearly in FIGS. 3 and 4, when the casing 40 is moved in surrounding relation with the drum 30 and winding 50, a pair of shoulder spacing rings 37 and 39 mounted on its interior make close fit mated engagement with the drum shoulders 31 and 33 respectively. A pair of bladder securing rings 42 and 44 also mounted on the interior of the casing, adjacent the spacing rings 37 and 39, respectively, similarly make a close fit engagement with the drum shoulders 31 and 33.

The spacing rings 37 and 39 as well as the bladder securing rings 42 and 44 both have tapered internal surfaces to match the inverse taper on the exterior of the drum shoulders 31 and 33 thereby establishing the desired snug fit relation of the exterior casing with the drum assembly.

The bladder 41 is inflated with fluid, such as air, by way of a fluid supply passage 36 which reaches through the casing wall. The bladder is held in an angularly lined relation with the casing by the securing rings 42 and 44 at opposite edges of the bladder which in turn are secured in place by bolts 43 and 45 respectively, which extend through the casing wall to the securing rings. A wide range of pressures can be selected for application to the windings 50 by way of the pressurized bladder, such pressures extending from atmospheric pressure to pressures in the range of 200 to 300 PSI if necessary.

As indicated, heat is supplied to the winding 50 by passage of fluid such as oil through the fluid passageways 35 in the drum as shown in cross section in FIG. 3, such temperatures, for example, being of desired magnitude such as in the order of 160 degrees F. to 400 degrees F. As an alternate, heat can be supplied by electrically hearing the drum such as by resistance or induction heating means. A sufficient amount of heat is supplied to cause the resin-impregnated network of filaments to substantially adhere to one another. FIG. 4 shows a cross sectional view of the drum 30 as the drum would appear on line 4—4 represented by the longitudinal cross sectional view illustrated in FIG. 3. The bladder 41 when inflated extends radially inward from the casing 40 and communicates in tight pressure relation with the composite sheet winding 50 on the drum 30.

After being subjected to a predetermined period of heat and pressure effective to cure the composite sheet material, pressure is released to deflate the bladder 41 to allow removal of the entire external casing 40 which therefore can be moved to a lateral position as in FIG. 5. The winding 50 then can be allowed to cool by exposure to the atmosphere. The winding alternately might be force cooled on the drum when found to be desirable by passing cooled oil or other suitable fluid through the fluid passageways 35 provided in the drum 30. Such cooling of the winding 50 can be accomplished either while it is under the pressure of the inflated bladder 41 or preferably while the bladder is deflated and the drum 30 is withdrawn from the casing 40 to its lateral position so that the forced cooling can be effected while the winding 50 is additionally cooled by exposure to the atmosphere.

The cooled winding of composite material 10 can then be unwound from the drum 30 and wound on a smaller diameter shipping tube 69 of acceptable shipping package size while the layer of separator material 17 is separately collected from the drum 30 for later reuse or disposal. When the desired length of composite material is wound onto the shipping tube, the continuous length of composite material is cut transversely, such as represented by a dashed line, to provide the finished shipping package illustrated in FIG. 7. A number of such shipping packages can be wound from a single continuous length of the relatively thin stack of composite material on the drum. By way of example, a shipping package wound on a 10 inch tube may contain 100 feet of length of composite sheet material while the drum has 1,000 foot length of the material thereon, adequate to supply 10 shipping packages.

The drum by way of example may have a diameter in the range of 30 to 100 inches or more, but by choice a diameter of 72 inches has been found quite satisfactory from the standpoints of capital investment, economics of production and product acceptability. The larger diameters in the range are preferred to provide the assuredly smooth finished surfaces of the composite sheet material. By so curing the composite material, the resulting sheet is dimensionally stable to a degree that it can tolerate being wound into the smaller diameter package without concern that when received by the user it will have other than smooth surfaces.

The type of filaments used to form the composite sheet material may vary widely and can be metallic filaments, semimetallic filaments, inorganic filaments or organic filaments. Preferred filaments are those having a tenacity equal to or greater than about 25 g/d, the tensile modules is equal to or greater than about 1000 g/d and the energy-to-break is equal to or greater than about 35 joules/gram. The strand bundles contain about 30 to about 2000 individual filaments of less than about 12 denier.

The impregnating material used in the filament layers can comprise one or more thermosetting resins or one or more thermoplastic resins, or a blend of such resins. The elongation of the resin/resin system is made to be greater than that of the reinforcing filament. Illustrative of useful thermosetting resins are vinyl esters and unsaturated polyesters, while thermoplastic resins may be Polystyrene-polyisoprene-polystyrene block copolymer thermoplastic elastomers. The impregnating material constitutes preferably about 10 to 30% of volume of the filaments.

The thickness of the surface films is minimally about 0.1 mil and may be as large as desired so long as the length is still sufficiently flexible to permit roll formation but is preferred to be in the range of 0.35 to 0.50 mil. Heat and/or pressure may cause the desired adherence or where necessary a suitable adhesive which is heat and pressure sensitive between the film and the filament network may be.

Although the preferred embodiment of the processes here shown, wherein the heat and pressure is supplied to the winding of composite material on the drum without transporting the loaded drum, it is possible where conveying equipment is available to subject the drum with the windings thereon to heat and pressure in an autoclave to provide the dimensional stability desired for winding the composite sheet material into smaller packages.

As another form of the invention, where the continuous sheet of composite material being formed is desired to be wider than the width of the sheet of core components available, two adjacent side-by-side layers in interedge association can be integrated between two facial layers of the composite sheet.

In view of the foregoing it will be understood that variations of the arrangement of our invention can be provided within the broad scope of principles embodied therein. Thus, while a particular preferred embodiment of the method of our invention has been shown and described, it is intended by the appended claims to cover all such modifications which fall within the true spirit and scope of the invention.

We claim:

1. The method of forming a given length of continuous length resin composite sheet material having thermoplastic film surfaces and a filament network core material inbetween comprising providing a large diameter rotatable forming drum for assembly of said composite sheet material, said drum having a diameter in the range of 30 to 100 inches, feeding from a source a first thermoplastic resinous facing film to said drum, feeding a continuous layer of core material of continuous filament strands to said drum for association with said first facing film, feeding a second thermoplastic resinous facing film to said drum for association with the opposite side of said core material to form the assembly of said composite sheet material, feeding from a source a layer of separator material inbetween wraps of said composite sheet material as they are wound on said drum, winding a number of wraps of said composite sheet material and separating material on said drum, subjecting the wraps of said composite sheet material on said drum to pressure and to heat to integrate the components of said assembly into interbonded relation, maintaining said heat and pressure on said assembly for a cycle period adequate to integrate said components into an integrated dimensionally stabilized cured composite sheet, providing in said method a forming drum with a sufficiently large diameter such that said winding of said given length of composite sheet material is stacked to a dimension sufficiently thin relative to the diameter of said drum that the differential in compression of said composite under heat and pressure is sufficiently low that the cured composite material is free of surface wrinkles and creases.

2. The method of claim 1 wherein a pressure cylinder is provided in surrounding relation about the wrappings on said drum adapted to apply heat and pressure to said wrappings.

3. The method of claim 2 in which the winding on said drum is pressurized and subjected first to a cycle of heating and then to a cycle of cooling.

4. The method of claim 3 in which said wraps are heated by flowing a heated fluid through passages extending through the wall of said drum.

5. The method of claim 3 in which said winding on said drum is force cooled.

6. The method of claim 5 in which the forced cooling of said wraps is effected by passage of cooling fluid through the walls of said drum.

7. The method of claim 1 in which the said composite sheet material in its dimensionally stable condition is unwound from said drum and wound onto a shipping tube of diameter in the range from 8 to 12 inches.

8. The method of claim 7 wherein said drum is at least 4 times the diameter of the shipping tube.

9. The method of claim 1 in which the winding of said composite sheet material and separation material on said drum is unwound after being cured to a dimensionally stabilized condition and said separating material is collected while said cured composite is wound onto a shipping tube of diameter in the range from 8 to 12 inches and said drum has a diameter of approximately 72 inches to promote formation of an acceptable shipping package of such wrinkle free composite material.

10. The method of claim 1 wherein the assembled composite sheet material is cured by supply of heat from the interior of said forming drum and application of pressure to the composite material thereon from outside the forming drum.

11. The method of claim 10 comprising surrounding the composite material on said forming drum with fluid inflated bag means and inflating said bag means to apply curing pressure uniformly on said wound composite material.

12. The method of claim 10 comprising heating said forming drum by passing heated fluid through said drum adequate to cure said composite sheet material.

13. The method of claim 10 comprising electrically heating said forming drum to cure said composite sheet material.

* * * * *